May 11, 1926.
J. D. ARCHARD
1,584,590
CORD HOLDER AND GUIDE
Filed Nov. 12, 1924
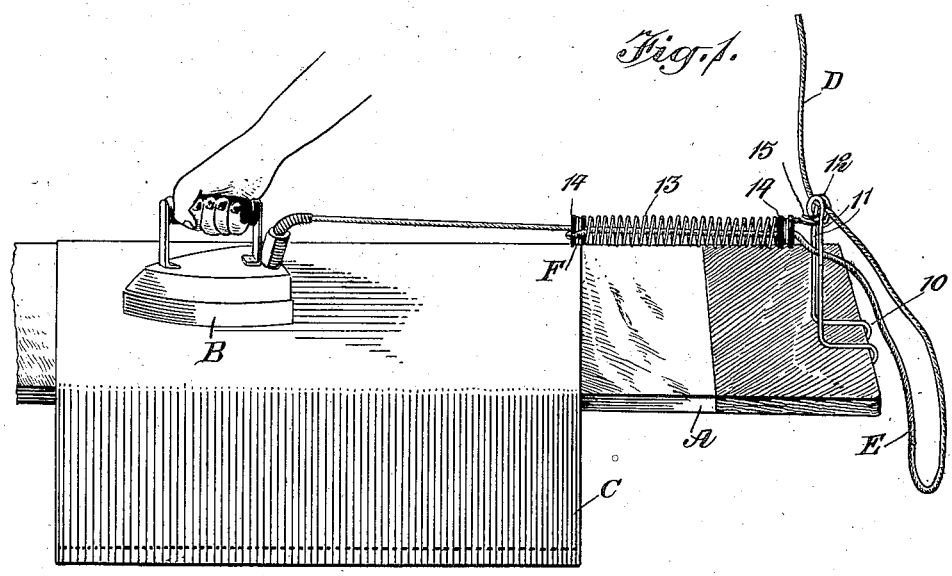
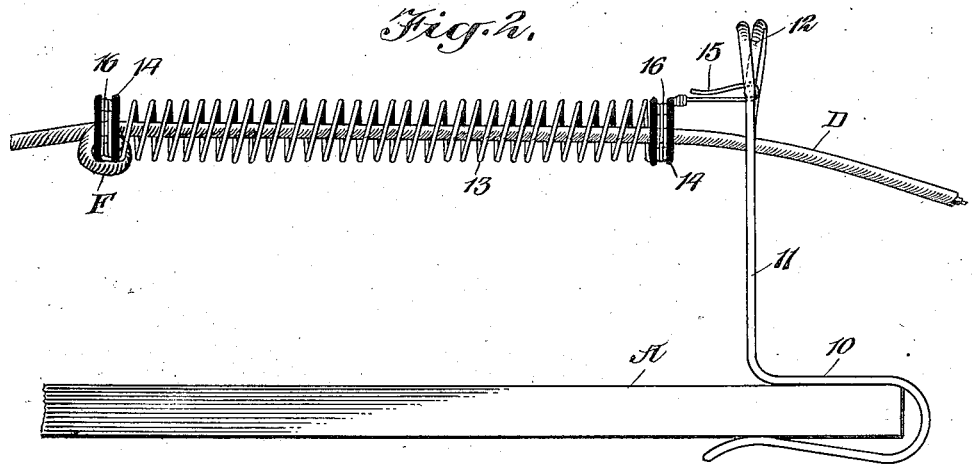
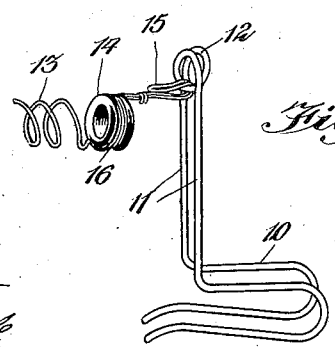
WITNESSES
INVENTOR
Josephine D. Archard
BY
ATTORNEYS Patented May 11, 1926.

1,584,590

UNITED STATES PATENT OFFICE.

JOSEPHINE D. ARCHARD, OF YONKERS, NEW YORK.

CORD HOLDER AND GUIDE.

Application filed November 12, 1924. Serial No. 749,471.

My invention while adapted to hold and guide cords of various kinds is particularly designed for use in holding and guiding the conducting cord leading to an electric flat iron.

The general object of the invention is to provide a device for the indicated purpose including means to hold the device in position on an ironing board or equivalent support and means with which the cord may be engaged to maintain a slack loop therein for permitting freedom of movement of the flat iron or other device to which the cord is attached; together with a cord-holding and guiding extensile and contractile spring through which the cord may be passed and with which the cord may be engaged in a manner that the slack provided by the loop in the cord will pay out as the iron or other implement is moved away from the supporting and loop-forming means and will be restored upon a return movement of the iron or other implement.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a perspective view of a cord holder and guide constituting an embodiment of my invention showing the same in connection with an ironing board and an electric flatiron.

Figure 2 is an enlarged side elevation showing the cord holder and guide in position;

Figure 3 is a perspective view of the cord holder and guide, a portion of the spring being omitted.

In the illustrated example of my invention the letter A indicates an ironing board; B, an electric iron; C, a garment to be ironed, and D indicates the cord which in the present instance is a conductor cord.

I provide, in accordance with my invention, means to affix my improved cord-holding and guiding device to the ironing board A. Said means in the illustrated example includes a clamp 10 rising from which in the present example are members 11 here shown as separate standards which at the upper end are formed integral with a coil 12, between the convolutions of which a conductor cord D or equivalent cord is clamped as shown in Figure 1. My improved device functions to allow for the forming of a loop E in the cord D as further referred to.

In association with the described means for applying the device to an ironing board, table, or the like, through the medium of the clamp 10 in the illustrated example, I provide means to permit the movement of the cord forward and back or in any desired direction while maintaining the cord in such form as to prevent interference with the work being done or the person operating the iron or other implement B, for which purpose an elongated coil spring 13 is provided, which advantageously has guide eyes 14 at the ends thereof. The cord D is made fast to the forward end of the spring 13 preferably by giving the cord a bend F about the forward ring 14 as indicated in Figures 1 and 2. At the opposite end of the spring 13 the cord D freely passes through the rear eye 14. At the rear end of the spring 13 a suitable means is provided, to connect the same with the standards 11 or coil 12 for which purpose in the example shown the material of the spring is formed into a hook 15 which is shown snapped into engagement with the coil 12. The wire of the spring 13 has a turn at each end as at 16 about the guide eyes 14.

With the described assemblage the cord D is brought from the wall plug or other source and held against longitudinal movement through the medium in the present instance of the convolutions of the coil 12 acting as a clamp. The cord is formed into a loop E and is then either passed through the eyes 14 and spring 13 as shown and connected with the iron B or other implement, or it may be passed along the exterior of the spring and secured to the free end of the spring. The coil spring 13 is normally unstressed and forms simply a longitudinal guide for the cord. When, however, the iron B is advanced on the piece of work C on ironing board A, the connection of the cord with the spring as at F will cause the spring to be distended and stressed. Upon a return movement of the iron B to any extent toward the cord holder, the spring 13 will take up the slack in the cord the latter forming automatically into the loop E. It will be readily understood from the foregoing that at no time is the cord permitted to encumber the ironing board or the piece of work C and with the automatic maintaining of the loop E in the cord the latter is prevented from becoming entangled with the person or garments of the operator.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A cord holder and guiding device including a standard, a clamp at the lower end of the standard to secure the same to a support, clamp loops at the upper end of said standard adapted to clamp a cord, a coil spring, means detachably holding said spring at one end to said standard at said clamp loops, said spring adapted to receive a cord beyond the said clamp whereby to retract the cord after the spring has been distended by a pull on the cord.

2. A cord-holding and guiding device including a clamp to engage an ironing board or like support, a portion rising from the clamp, cord clamping means at the upper end of said portion, and a spring held at one end against longitudinal movement adjacent to said cord-clamping means to prevent longitudinal movement of the held end of the spring.

3. A cord-holding and guiding device including a clamp to secure the device to an ironing board or similar support, a portion rising from the clamp, a cord clamp at the upper end of said portion, and a spring having a hook detachably engaging said spring with said cord clamp.

JOSEPHINE D. ARCHARD.